Feb. 3, 1959   M. NAVRATIL ET AL   2,871,693
DEVICE FOR CALIBRATING INDICATORS OF TORSIONAL
OSCILLATIONS DURING ROTATION
Filed April 12, 1956   2 Sheets-Sheet 1
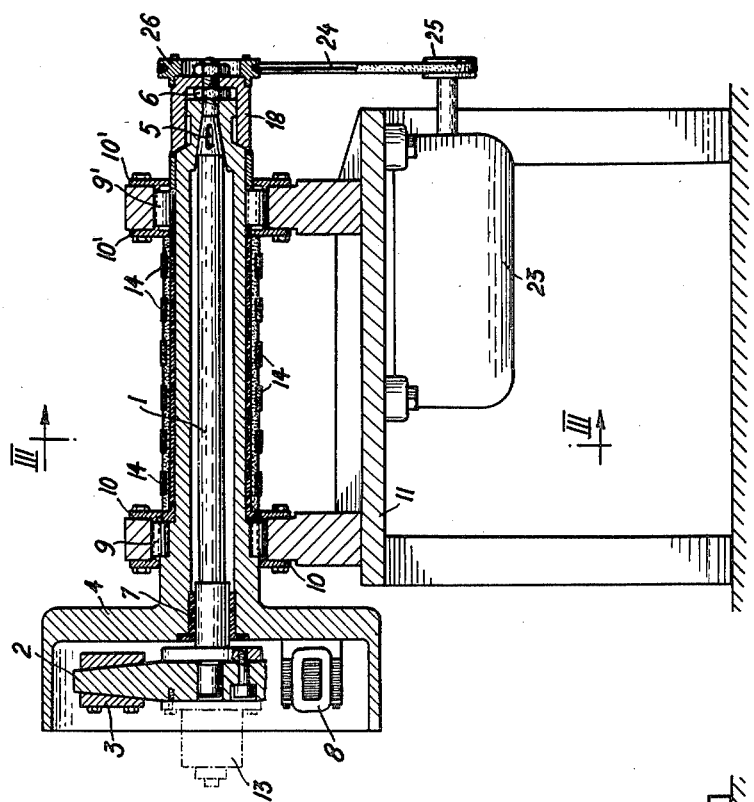
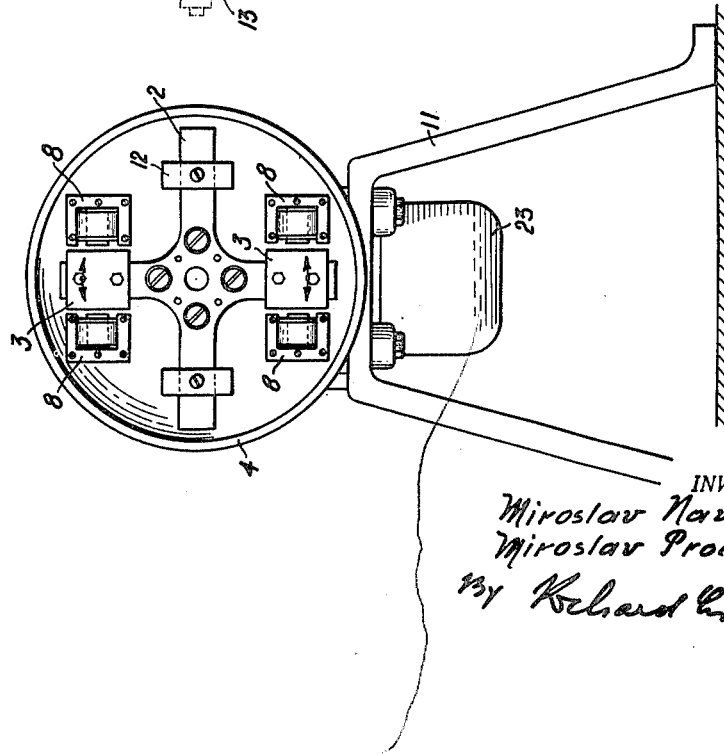
INVENTORS
Miroslav Navrátil
Miroslav Procházka Feb. 3, 1959   M. NAVRATIL ET AL   2,871,693
DEVICE FOR CALIBRATING INDICATORS OF TORSIONAL
OSCILLATIONS DURING ROTATION
Filed April 12, 1956   2 Sheets-Sheet 2
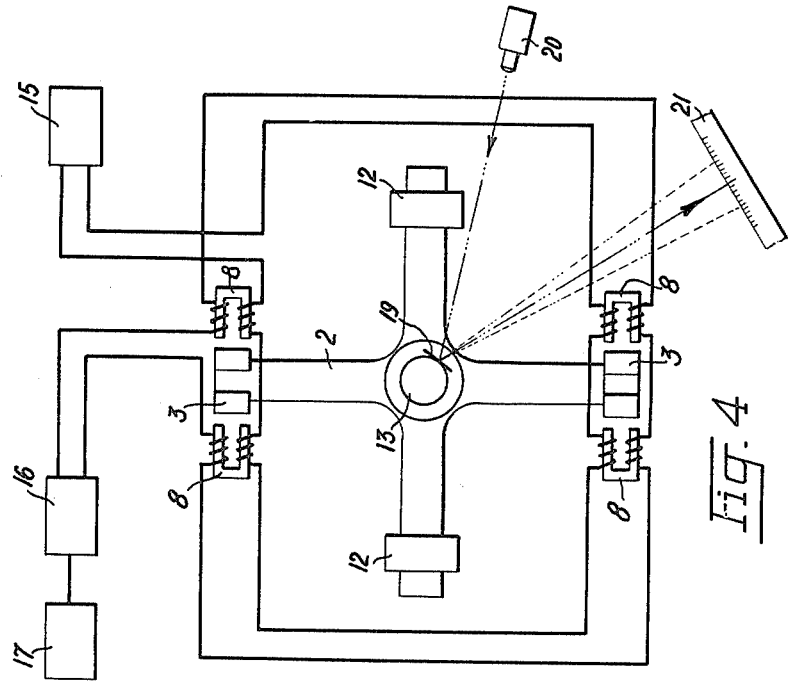
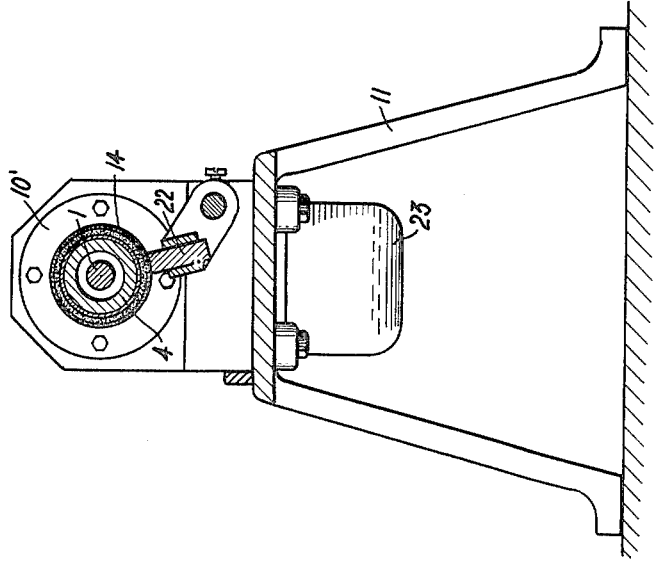
INVENTORS
Miroslav Navrátil
Miroslav Procházka
By Richard Low agt

United States Patent Office 2,871,693
Patented Feb. 3, 1959

2,871,693

DEVICE FOR CALIBRATING INDICATORS OF TORSIONAL OSCILLATIONS DURING ROTATION

Miroslav Navratil, Prague, and Miroslav Prochazka, Tuchomerice, Czechoslovakia

Application April 12, 1956, Serial No. 577,792

4 Claims. (Cl. 73—1)

The present invention relates to a device for calibrating indicators of torsional oscillations during rotation.

The main object of the present invention is to provide an improved calibrating and testing device for checking indicators of torsional oscillations, so called torsiographs, which are important instruments for checking the vibration characteristics of a crankshaft and for determining and checking suitable means for absorbing torsional oscillations.

When designing new types of torsiographs it is also necessary to carry out extensive tests as to their strength under conditions which imitate as far as possible the conditions of measurements on internal combustion engines. An important purpose of these tests is also to verify the correct operation of the collecting device, which transmits the electric voltage from the rotating torsiograph to the non-rotating indication means in such a way as to comply with the requirements placed on the accuracy of the measurement as well as on the mechanical resistance of this part of the torsiograph.

The hitherto known and used devices for calibrating torsiographs do not comply with all the above requirements placed upon them particularly because they are generally capable of producing only some of the working conditions under which the torsiograph actually operates. Devices are, for instance, known, which are capable of producing torsional oscillations in a system without rotation or which are capable of producing rotation of the system without torsional oscillations, or finally devices which are capable of fulfilling both functions, but in which the frequency of the torsional oscillations is bound in an unvarying ratio with the revolutions of the system, undergoing the torsional oscillations.

The above serious drawbacks of the hitherto known devices are eliminated in the calibrator according to the present invention. The substantial improvement of the new calibrator resides in the fact that it is possible to create as desired the requisite conditions for testing or calibrating torsiographs during rotation, this being accomplished by adjustment, independent of each other, of:

(a) The frequency of torsional oscillations (b) The magnitude of amplitude or torsional oscillations (c) The rotational speed at which the calibration is carried out.

It follows from the foregoing that contrary to the known devices the calibrator according to the present invention makes possible not only tests during rotation but also particularly exact tests without rotation, e. g. in connection with a suitable optical arrangement consisting of a galvanometric lamp, a mirror and a scale on opal glass as will be explained later in greater detail.

The principle and operation of the calibrator according to the invention are clarified by an example as represented in the accompanying drawings, wherein Fig. 1 shows a longitudinal axial section of the entire calibrating device, Fig. 2 is an end elevational view of the device of Fig. 1;

Fig. 3 is a transverse sectional view taken along the line III—III of Fig. 1; and Fig. 4 represents a wiring diagram of the entire measuring apparatus operating with the calibrator according to the invention.

Referring first to Figs. 1, 2 and 3, it will be seen that the main operative part of the calibrator according to the invention is a mechanical system carrying out torsional oscillations, said system consisting of a torsionally oscillating shaft 1, and of a cross-shaped member 2, carrying armatures 3 and additional masses 12. The shaft 1 which represents the torsionally elastic member of the system, is mounted axially in the hollow elongated hub of a fly wheel 4 which, at one end, has a conical surface engaging a corresponding conical surface on an end of the shaft 1 and is secured to the latter, for instance by a key 5 and nut 6. The other end of the shaft 1 is mounted for rotation in a bearing 7 carried by the fly wheel 4 and extends into the enlarged part of the cavity of the flywheel 4. To this other end of the shaft 1 the cross-shaped member 2, made of a low permeable or non-ferromagnetic material, for example, of Duralumin or other aluminum alloys, is rigidly secured.

Two pairs of armatures 3 of the exciting electromagnetic system are secured symmetrically to the two opposite arms of the cross 2. Opposite the armature 3 two pairs of electromagnetic vibrators 8 are placed, the latter being rigidly fastened to the fly wheel 4, with which they form a torsionally non-oscillating unit. The remaining two opposite arms of the cross 2 carrying changeable seismic masses 12, which may be displaced radially with respect to the axis of rotation. In this way the required inertia moment of the torsionally oscillating system may be adjusted roughly or in fine limits so that even the frequency of the free torsional oscillations of this system may be adjusted as desired. The tested torsiograph 13 is itself (Fig. 1) clamped to the cross-shaped member 2 at the axis of rotation.

The electromagnets 8 secured to the fly wheel 4 are provided with two coils supplied with electric current from outer sources through collecting rings 14 and brushes 22. One coil is supplied with direct current, from a source 15 of direct current (Fig. 3) and produces a magnetic field of constant magnitude. The other coil is supplied from an output amplifier (e. g. 1 kw.) of alternating current, indicated at 16, the frequency of which is continuously variable by means of an exciting tone generator 17. The alternating magnetic field produced by the coil supplied from amplifier 16 is superimposed on the constant magnetic field produced by the coil supplied with direct current from the source 15.

The torsionally non-oscillating system which includes the fly wheel 4 and the vibrators 8 (Fig. 1) and which contains the torsionally oscillating system including the shaft 1, cross 2, armatures 3 and masses 12, arranged as described above, is, together with this latter system mounted for rotation in bearings 9, 9′, secured in rings 10, 10′ in the frame 11 of the apparatus. The entire assembly is set in rotation by a regulating electromotor 23 which has a pulley 25 on its shaft driving a belt 24 running over a pulley 26 connected to a flange 18 secured on the hub of fly wheel 4. The torsional oscillations may thus be produced in the assembly either in a non-rotating state or when rotating at any desired rotational speed.

From the preceding description as well as from the drawings the basic principle of operation of the calibrator according to the invention will be apparent. When the calibrator is operated, the electromagnets 8 secured to the fly wheel 4 act with alternating forces, having a frequency variable as desired, upon the torsional system 1, 2, 3, 12 in which they generate torsional oscillations. The frequency of such torsional oscillations may be varied over a wide frequency range out of resonance with the calibrator assembly itself, which makes possible a quick measurement of the torsiograph 13 at small torsional amplitudes.

When the exciting frequency of the tone generator 17 (Fig. 3) is adjusted so as to make the torsional system of the calibrator operate in resonance (the frequency of this resonance being variable as desired, as is apparent from the preceding description), particularly large torsional oscillations are obtained which imitate fully even the most difficult conditions occurring in connection with internal combustion engines and which otherwise could be produced only by the use of exceptionally large outputs. As the entire assembly may at the same time be independently rotated at any desired speed, the calibrator becomes practically universal and can imitate any, even the most difficult working conditions.

A great advantage of the calibrator according to the invention resides in the fact, that even under such difficult conditions of operation it works practically noiselessly. This makes possible a simple control of noise which is sometimes produced by the tested indicator of torsional oscillations and which possibly indicate a deficient condition in the latter and generation of parasitic oscillations capable of producing undesirable distortion of the signal from the indicator.

It is also worth noting that with a calibrator according to the invention it is by no means difficult to achieve a torsional amplitude of ±5°, even at frequencies of 500 C./S., which is impossible with any one of the hitherto known calibrators. Also the purity of the achieved harmonic movement is high and practically independent of the signal from the supplying sources, because the calibrator operates in resonance. The noiselessness of the calibrator is of advantage also from the point of view of working in closed laboratories.

As mentioned above, the calibrator according to the invention permits also the carrying out of particularly exact tests and measurements of torsional oscillations without rotation. An example of such a measurement in connection with an optical device is shown in Fig. 4. Here for instance a reflecting mirror 19 is secured to the tested torsiograph 13. Light rays from a galvanometric lamp 20 falling on the mirror 19 are reflected to an opal glass member 21 provided with a gauging scale. As a result of the oscillations of the mirror 19 the light rays produce on the scale of the opal glass 21 a luminous strip, indicating the torsional amplitude.

The advantageous qualities of the calibrator according to the invention make possible its practical use also for other purposes than for the calibration of torsiographs. As further possibilities of its application may be quoted in particular:

(1) Tests of absorbers of torsional oscillations of crank shafts of internal combustion engines;

(2) Tests of injection pumps for diesel engines which in operation are often subject to similar conditions, it being necessary to test them under such conditions, (3) Carrying out of certain tests of fatigue caused by the influence of torsional oscillations and simultaneous rotation.

We claim:
1. A calibrator for devices indicating torsional oscillations during rotation, comprising a rotatable fly wheel having an elongated hollow hub, a torsionally elastic shaft extending freely axially through said hub and rigidly connected, at one end, to the latter, means for rotating said fly wheel, a cross-shaped member secured on the other end of said shaft in proximity to said fly wheel and adapted to carry the indicating device to be tested in line with the axis of said fly wheel, hub and shaft, an electromagnetic exciting system including armatures on said cross-shaped member and exciting electromagnets on said fly wheel operative to oscillate said cross-shaped member relative to said fly wheel about the axis of the latter, and additional masses mounted on two opposite arms of said cross-shaped member, with the armatures being mounted on the second pair of opposite arms of the cross-shaped member, so that said cross-shaped member, armatures and additional masses form a torsionally oscillating assembly, while said fly wheel, hub and exciting electromagnets form a torsionally non-oscillating inertia assembly with which said torsionally oscillating assembly rotates in response to rotation of said fly wheel.

2. A calibrator as in claim 1; wherein said additional masses are adjustably mounted on said cross-shaped member for varying the radial distance between said masses and said axis of the fly wheel.

3. A calibrator as in claim 1; wherein each of said exciting electromagnets includes pole extensions also mounted on said fly wheel, and said armatures on the cross-shaped member extend between said pole extensions of the related armatures.

4. A calibrator for devices indicating torsional oscillations during rotation, comprising a fly wheel having an elongated, hollow hub extending axially from one side thereof, bearing means supporting said hub to mount said fly wheel for rotation about an axis passing axially through said hub and the center of said fly wheel, a torsionally elastic shaft extending axially through said hollow hub and fly wheel and rigidly connected to said hub at the end remote from said fly wheel, a cross-shaped member secured on the other end of said shaft in proximity to said fly wheel and adapted to have the indicating device to be tested mounted thereon at the axis of said shaft, an electromagnetic exciting system including armatures on said cross-shaped member spaced radially from said axis of the shaft and exciting electromagnets fixed on said fly wheel adjacent said armatures and operative with the latter to cause angular displacements of said cross-shaped member relative to said fly wheel which are yieldably resisted by torsional twisting of said shaft, and means operatively connected to said hub for effecting rotation of the latter and said fly wheel at an adjustably constant speed.

References Cited in the file of this patent

UNITED STATES PATENTS

| 2,396,540 | Stansfield | Mar. 12, 1946 |
| 2,469,417 | Stein | May 10, 1949 |
| 2,522,472 | Van Degrift | Sept. 12, 1950 |

FOREIGN PATENTS

| 852,909 | Germany | Oct. 20, 1952 |